(12) United States Patent
Creek et al.

(10) Patent No.: US 6,590,621 B1
(45) Date of Patent: Jul. 8, 2003

(54) DISPLAY APPARATUS COMPRISING AT LEAST TWO PROJECTORS AND AN OPTICAL COMPONENT WHICH SPREADS LIGHT FOR IMPROVING THE IMAGE QUALITY WHERE THE PROJECTORS' IMAGES OVERLAP

(75) Inventors: Roy Edward Creek, Newick (GB); Roger Alan Edwards, Bicester (GB)

(73) Assignee: Seos Limited, West Sussex (GB)

( * ) Notice: Subject to any disclaimer, the term of this patent is extended or adjusted under 35 U.S.C. 154(b) by 63 days.

(21) Appl. No.: 09/594,917

(22) Filed: Jun. 15, 2000

(30) Foreign Application Priority Data

Jun. 18, 1999 (GB) .............................................. 9914375

(51) Int. Cl.[7] .......................... G02F 1/1335; G03B 21/26
(52) U.S. Cl. ................................. 349/5; 349/7; 349/64; 353/30; 353/94
(58) Field of Search .............................. 349/5, 6, 7, 64, 349/95; 353/30, 94

(56) References Cited

U.S. PATENT DOCUMENTS

| | | | | |
|---|---|---|---|---|
| 4,222,641 A | * | 9/1980 | Stolov | 353/84 |
| 4,368,963 A | * | 1/1983 | Stolov | 353/31 |
| 4,695,892 A | * | 9/1987 | Mary | 358/225 |
| 5,626,411 A | | 5/1997 | Takahashi et al. | |
| 5,751,869 A | * | 5/1998 | Li et al. | 385/33 |
| 6,017,123 A | * | 1/2000 | Bleha et al. | 353/30 |
| 6,185,016 B1 | * | 2/2001 | Popovich | 359/15 |
| 6,222,593 B1 | * | 4/2001 | Higurashi et al. | 348/745 |
| 6,312,143 B1 | * | 11/2001 | Drazic et al. | 362/268 |

* cited by examiner

*Primary Examiner*—Robert H. Kim
*Assistant Examiner*—Andrew Schechter
(74) *Attorney, Agent, or Firm*—Iandiorio & Teska

(57) ABSTRACT

Display apparatus comprising at least two projectors (1, 2) which are each for providing a display, masks (10, 11), and optical control means (3, 4, 5, 6) for controlling via the masks (10, 11) the brightness of each display across an overlap region formed by parts of the displays that overlap, the optical control means (3, 4, 5, 6) comprising an optical component (13) which spreads light and which is positioned on an illumination side of a liquid crystal display panel (3) in each projector (1, 2).

8 Claims, 2 Drawing Sheets

DISPLAY APPARATUS COMPRISING AT LEAST TWO PROJECTORS AND AN OPTICAL COMPONENT WHICH SPREADS LIGHT FOR IMPROVING THE IMAGE QUALITY WHERE THE PROJECTORS' IMAGES OVERLAP

This invention relates to display apparatus and, more especially, this invention relates to display apparatus comprising at least two light valve display projectors which are each for providing a display.

Light valve projectors, and in particular liquid crystal display projectors, are becoming increasingly used for displays. Compared with cathode ray tube projectors, the liquid crystal projectors have the advantage of high brightness and relatively low cost. In addition, their red, green and blue displays generally emerge through a single lens, thereby avoiding the need to realign the colour convergence each time the projector is repositioned. Some liquid crystal display projectors have a single colour liquid crystal display panel, whilst others have separate liquid crystal display panels for red, green and blue, with the beams being combined optically on to a common axis prior to projection by the lens.

In order to generate a display providing a large field of view to the observer, displays from several projectors may be combined together by what is known as "tiling". For many applications, it is essential for the joins between adjacent displays to be as inconspicuous as possible. It is difficult to form an inconspicuous join simply by butting adjacent displays together. Firstly, such an arrangement is very sensitive to any misalignment. Secondly, when used on non-flat screens as is frequently the case, the edges of adjacent displays will generally follow different curves on the screen, making it impossible to form a butted join.

A better approach to allow adjacent displays to overlap. Within the overlap region is a blend region in which the brightness of each display is adjusted so as to fall progressively from the maximum value at the inner edge of the blend to zero at the outer edge of the blend. With an appropriate choice of brightness profiles, it may be arranged for the brightness of the sum of the two displays to be essentially constant across the overlap region. This gives an inconspicuous blend which is also less sensitive to misalignment than a butted join. In the case of cathode ray tube projectors, this technique has been successfully used, with the brightness profile within the blend region being controlled electronically by adjusting the video level.

In the case of liquid crystal display projectors, adjustment of the brightness across the blend region by adjusting the video level is of limited use. This is because the liquid crystal display panels, which act as light valves, are not capable of totally blocking the light in response to a black level signal. This, together with the high brightness of liquid crystal display projectors, means that a "black" level display is still bright enough to be visible. Where two channels overlap, two black levels are superimposed, making the overlap noticeably brighter than the single display regions. If the displays are tiled both horizontally and vertically, there will also be regions where four black levels are superimposed. While a reasonable blend may be obtained by controlling the brightness electronically via the video when the scene content is bright, for lower brightness scenes, the quality of the blend becomes progressively worse. For this reason, it is preferable to use optical techniques for controlling the brightness of each display across the overlap region.

Optical techniques for controlling the brightness of each display across the overlap region have their limitations. The basic concept of optical blending may be understood by considering a mask located between the exit pupil of the projector and the screen. This gives rise to a progressive reduction in brightness for maximum to zero across the blend region. The zero level is now a true black since here the light is totally blocked by the mask. Thus this method overcomes the problem of achieving a good black level. By adjusting the distance of the mask from the projector, the required blend width may be obtained on the screen. It is not necessary for the mask to be located outside the projector. Other possible locations are just behind, or just in front of, the liquid crystal display panels. Again, the width of the brightness profile on the screen may be set as required by adjusting the distance of the masks from the liquid crystal display panels.

Although this method overcomes the black level problem, another problem arises due to a feature of liquid crystal display projectors. More specifically, in order to achieve high brightness, it is necessary to collect light from a large solid angle around the lamp. This is usually achieved by placing a parabolic or elliptical mirror behind the lamp in order to direct the light towards the liquid crystal display panels. In itself, however, this would give a dimmer central region of the display since the lamp obstructs any light reflected from the central region of the mirror, which is normally cut away anyway for insertion of the lamp. This is usually overcome by inserting some form of light integration optics between the lamp mirror and the liquid crystal display panels. Typically, this is a pair of plates containing lenslets. Each lenslet on the first plate combines with the corresponding lenslet on the second plate to spread the light over the entire liquid crystal display. The overall effect is to give good uniformity of illumination of the liquid crystal display, and hence good brightness uniformity of the projected display on the screen.

In order to couple the light efficiently into the projection lens, optics consisting of one or more field lenses are located in the region of the liquid crystal display panel to form an image of the second integrator plate at the projection lens entrance pupil. This means that the projector lens pupil is not illuminated uniformly, but rather consists of a pattern of bright spots corresponding to the light integrator lenslets. Therefore the brightness profile produced by the blending mask does not fall smoothly from maximum to zero, but has a rippled structure. The profile may vary from one projector to another, depending upon the alignment of the lamp, mirror, and integrator plates. Thus, when two such patterns are superimposed in an attempt to form a blend, this almost invariably gives rise to a significant brightness ripple across the blend.

It is an aim of the present invention to achieve a high quality optical blend by the above described means, but with a novel means of overcoming the problem arising from the inherent brightness non-uniformity across the exit pupil of light valve projectors such for example as liquid crystal display projectors and various other light valve projectors.

Accordingly, the present invention provides display apparatus comprising at least two light valve projectors which are each for providing a display, masks, and optical control means for controlling via the masks the brightness of each display across an overlap region formed by parts of the displays that overlap, the optical control means comprising an optical component which spreads light and which is positioned on an illumination side of a light valve display panel in each projector.

As indicated above, the optical component is located on the illumination side of the light valve display panel in each projector. The exact location is not critical, and it may be selected for various projectors on the basis of mechanical accessibility. Thus, for example, the optical component may be positioned adjacent the light valve display panel, for example positioned between the light valve display panel and a field lens.

The display apparatus may be one in which the optical component is a greyed or ground glass screen. Alternatively, the optical component may be a holographic light spreading component. Alternatively, the optical component may be a microlens array. Alternatively, the optical component may be a cylindrical lens array. Other types of optical component may be employed if desired.

Preferably, the light valve projectors are liquid crystal display projectors. Preferably, the light valve projectors are liquid crystal display projectors.

An embodiment of the invention will now be described solely by way of example and with reference to the accompanying drawings in which.

Figure 1:
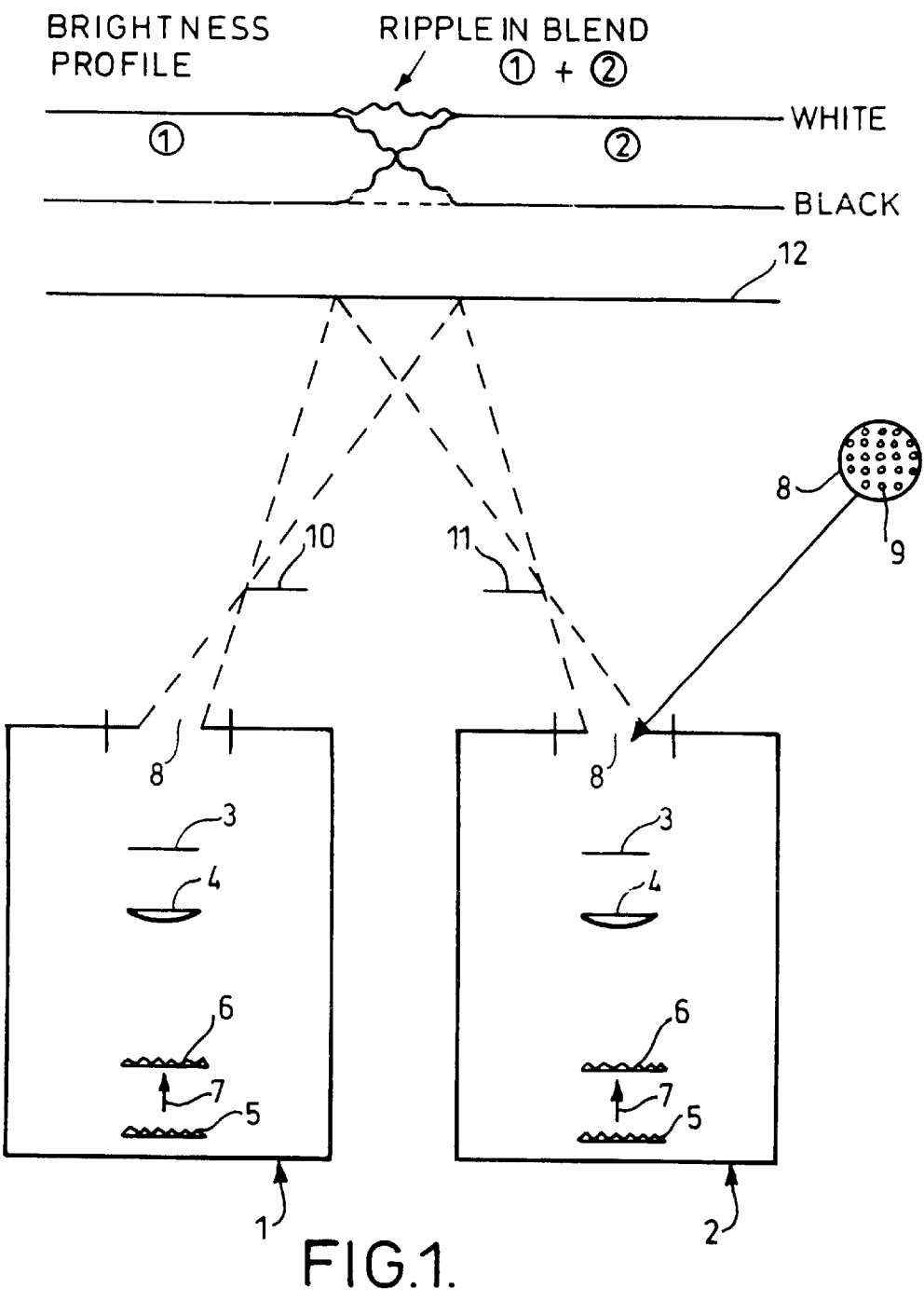
FIG. 1 shows known display apparatus.

Referring to FIG. 1, there is shown display apparatus comprising two liquid crystal display projectors 1 and 2 which are each for providing a display. Projector 2 is shown as having optical control means comprising a liquid crystal display panel 3, a field lens 4, a first integrator 5, and a second integrator 6. Light strikes the second integrator 6 as shown by arrow 7.

The projector 2 has a projection lens pupil 8 and an image 9 of the second integrator 6 occurs in the pupil 8.

As shown, the projector 1 is similarly constructed as the projector 2. Masks 10, 11 are employed as shown to provide a display on a screen 12. FIG. 1 shows schematically how the display apparatus shown in FIG. 1 results in low quality optical blending with a ripple in the blend of the images from the projectors 1 and 2.

Figure 2:
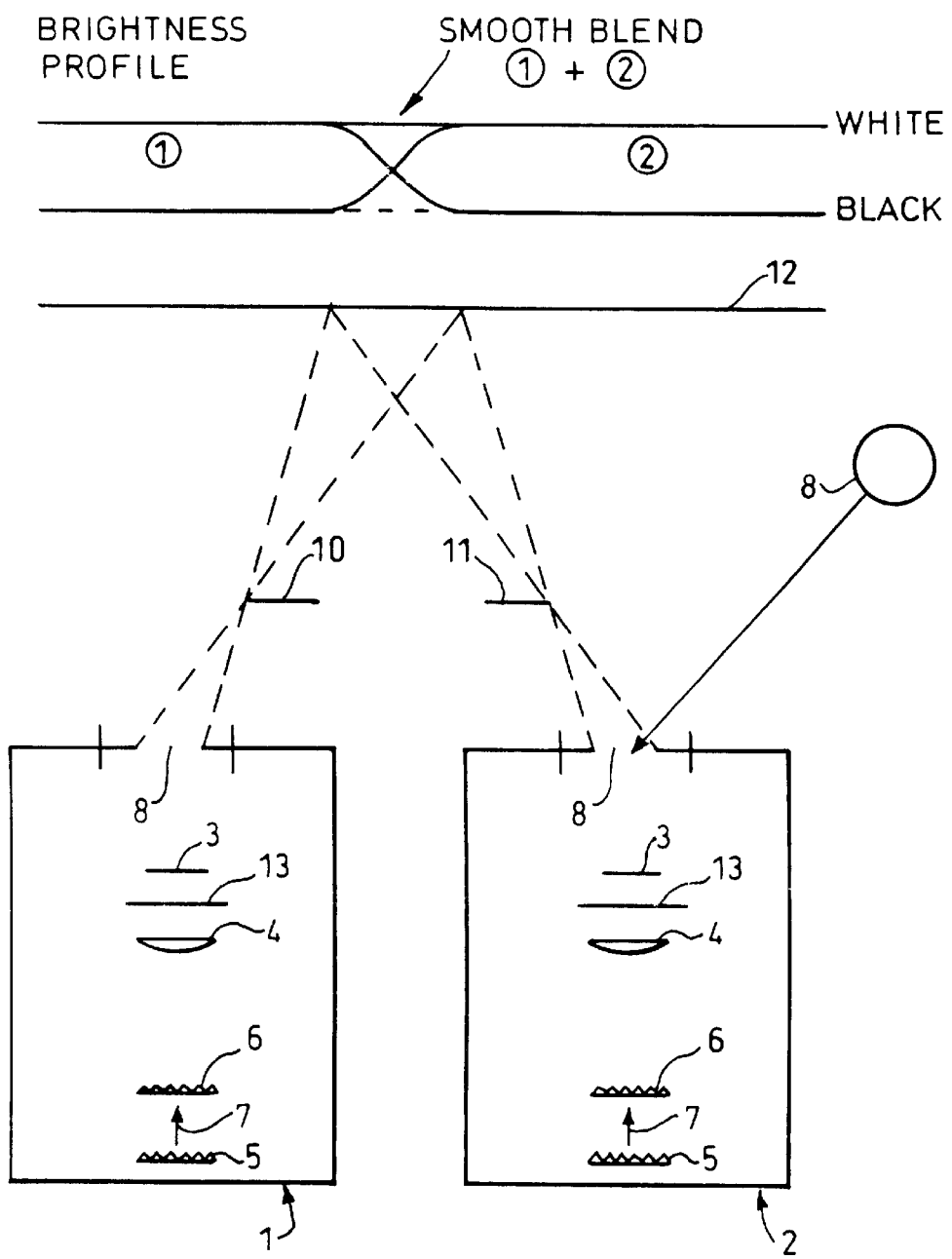
FIG. 2 shows display apparatus in accordance with the present invention.

Referring now to FIG. 2, there is shown similar display apparatus to that shown in FIG. 1. Similar parts have been given the same reference numerals for ease of comparison and understanding. In FIG. 2, the projector 2 has the optical control means as shown in FIG. 1 but the optical control means also includes an optical component 13. The optical component 13 spreads, for example diffuses, the light. The optical component 13 is positioned on the illumination side of the liquid crystal display panel 3. More specifically, the optical component 13 is positioned adjacent the liquid crystal display panel 3. Still more specifically, the optical component 13 is positioned between the liquid crystal display panel 3 and the field lens 4. As shown in FIG. 2, the projector 1 is similarly constructed. The pupil 8 is essentially uniformly illuminated and there is no image 9 in the pupil 8. Thus, as shown in FIG. 2, a smooth optical blend is achieved.

In FIG. 2, if the projector 2 has separate liquid crystal display panels 3 for the colours red, green and blue, then an optical component 13 will be provided behind each separate liquid crystal display panel.

In operation of the display apparatus as shown in FIG. 2, the optical component 13 causes a blurring of the image of the second integrator 6 formed in the projection lens pupil 8. The second integrator 6 is shown in the form of a plate. As compared with the display system shown in FIG. 1, the display system shown in FIG. 2 gives, by use of the optical component 13, a more uniform distribution across the pupil 8. This more uniform distribution across the pupil 8, in conjunction with the blending mask 11, gives a smoother transition from maximum to zero brightness. When two such profiles are superimposed from the projectors 1 and 2, the combined brightness across the blend region is essentially uniform, giving an inconspicuous blend.

The quality of the blend is maintained over the entire brightness range of the projectors 1 and 2. The optical component 13 does not blur the projected liquid crystal display image, since the optical component 13 is located before the liquid crystal display panel 3.

The use of the optical component 13 may result in some loss in display brightness, since the spreading action may cause some light to miss the lens pupil 8. In practice, the degree of spread may be optimised to suit a particular projector so as to give a high quality blend, whilst minimising the amount of light missing the pupil 8.

In its simplest form, the optical component 13 may be a greyed or ground glass screen. Optical components may be utilised giving varying amounts of diffusion, enabling an optimum to be utilised. A shortcoming of the use of the optical component 13 is that there is additional light loss, since a significant amount of light is scattered in a backward direction. Efficiency may be improved by using holographic diffusers, which spread a high portion of the incident light over a given cone angle in the forward direction. Optical components having various cone angles can be tried in order to obtain an optimum value to suit a particular projector being used. If desired, optical components may be employed which spread the beam into an elliptical shape, which may be of use where blending is only required in one plane, such as in a system formed by a single row or column of displays.

It is to be appreciated that the embodiment of the invention described above with reference to the accompanying drawings has been given by way of example only and that modifications may be effected. Thus, for example, high efficiency in the display apparatus may be achieved by using an optical component 13 in the form of a microlens array, where the amount of spread of the light is determined by the F-number of the lenses in the microlens array. The use of the microlens array necessitates care in overcoming Moire fringing due to interference between the microlens array and the liquid crystal display pixel structure. Where blending is required in one dimension only, a cylindrical lens array may be used.

What is claimed is:

1. Display apparatus comprising at least two light valve projectors which are each for providing a display, masks, and optical control means for controlling via the masks the brightness of each display across an overlap region formed by parts of the displays that overlap, the optical control means comprising an optical component which spreads light and which is positioned on an illumination side of a light valve display panel in each projector.

2. Display apparatus according to claim 1 in which the optical component is positioned adjacent the light valve display panel.

3. Display apparatus according to claim 2 in which the optical component is positioned between the light valve display panel and a field lens.

4. Display apparatus according to claim 1 in which the optical component is a ground glass screen.

5. Display apparatus according to claim 1 in which the optical component is a holographic light spreading component.

6. Display apparatus according to claim 1 in which the optical component is a microlens array.

7. Display apparatus according to claim 1 in which the optical component is a cylindrical lens array.

8. Display apparatus according to claim 1 in which the light valve projectors are liquid crystal display projectors, with the light valve display panels being liquid crystal display panels.

* * * * *